(12) United States Patent
Vale

(10) Patent No.: US 6,359,572 B1
(45) Date of Patent: Mar. 19, 2002

(54) DYNAMIC KEYBOARD

(75) Inventor: Peter O. Vale, Bracebridge (CA)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/146,769

(22) Filed: Sep. 3, 1998

(51) Int. Cl.$^7$ ..................... H03K 17/94; H03M 11/00
(52) U.S. Cl. ..................... 341/23; 341/22; 345/172; 345/173
(58) Field of Search ............... 341/23, 22; 345/172, 345/173; 340/825.19

(56) References Cited

U.S. PATENT DOCUMENTS

| | | |
|---|---|---|
| 5,058,046 A | 10/1991 | Lapeyre |
| 5,128,672 A * | 7/1992 | Kaehler ........................ 341/23 |
| RE34,476 E | 12/1993 | Norwood |
| 5,276,794 A | 1/1994 | Lamb, Jr. |
| 5,517,578 A | 5/1996 | Altman et al. |
| 5,528,743 A | 6/1996 | Tou et al. |
| 5,574,482 A | 11/1996 | Niemeir |
| 5,644,339 A | 7/1997 | Mori et al. |
| 5,748,512 A | 5/1998 | Vargas |
| 5,777,605 A | 7/1998 | Yoshinobu et al. |
| 5,818,425 A | 10/1998 | Want et al. |
| 5,838,302 A | 11/1998 | Kyriyama et al. |
| 5,914,707 A | 6/1999 | Kono |
| 5,936,614 A | 8/1999 | An et al. |
| 6,008,799 A | 12/1999 | Van Kleeck |
| 6,018,335 A * | 1/2000 | Onley et al. ................... 341/22 |
| 6,031,525 A | 2/2000 | Perlin |
| 6,094,197 A | 7/2000 | Buxton et al. |
| 6,169,538 B1 * | 1/2001 | Nowlan et al. ............. 345/173 |
| 6,199,125 B1 * | 3/2001 | Cortesi ........................ 345/173 |

FOREIGN PATENT DOCUMENTS

| | | |
|---|---|---|
| EP | 0 464 712 | 1/1992 |
| JP | 1-191226 | 8/1989 |
| JP | 8-22385 | 1/1996 |
| WO | WO 92/09944 | 6/1992 |

OTHER PUBLICATIONS

Anonymous, "Soft Adaptive Follow–Finger Keyboard for Touch–Screen Pads." *IBM Technical Disclosure Bulletin*, vol. 36. No. 11, pp. 5–7 (Nov. 1993).

Anonymous, "Function–Independent Approach to Driving Soft Keyboards," *IBM Technical Disclosure Bulletin*, vol. 33, No. 4, pp. 159–161 (Sep. 1990).

Kano, Nadine, *Developing International Software for Windows 95 and Windows NT*, Chapter 7, Appendix N and Appendix O, Microsoft Press, pp. 202–229, 553–556, 557–563 (1995).

* cited by examiner

Primary Examiner—Timothy Edward, Jr.
(74) Attorney, Agent, or Firm—Michalik & Wylie, PLLC

(57) ABSTRACT

An improved method and system for receiving user input data into a computer system having a keyboard with a dynamic key that changes its meaning and appearance in response to a predicted need of a user. The dynamic key is preferably provided on a displayed keyboard of a touch-sensitive input panel. Characters are provided to a prediction engine which returns a prediction comprising a likely next character, such as a punctuation symbol. The meaning and appearance of the dynamic key may change based on the prediction, whereby a user may more efficiently enter data via a fixed number of keys.

21 Claims, 13 Drawing Sheets

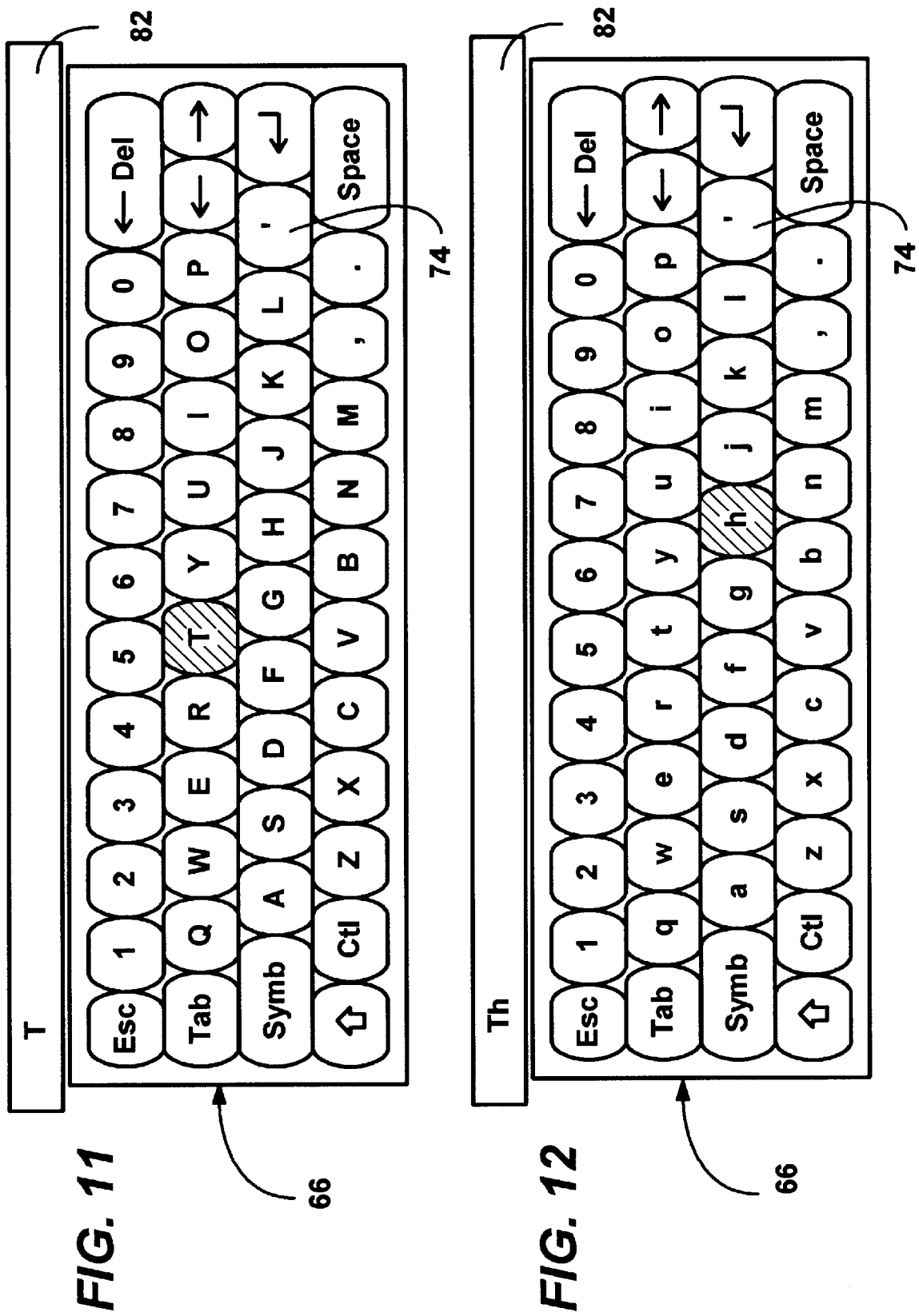

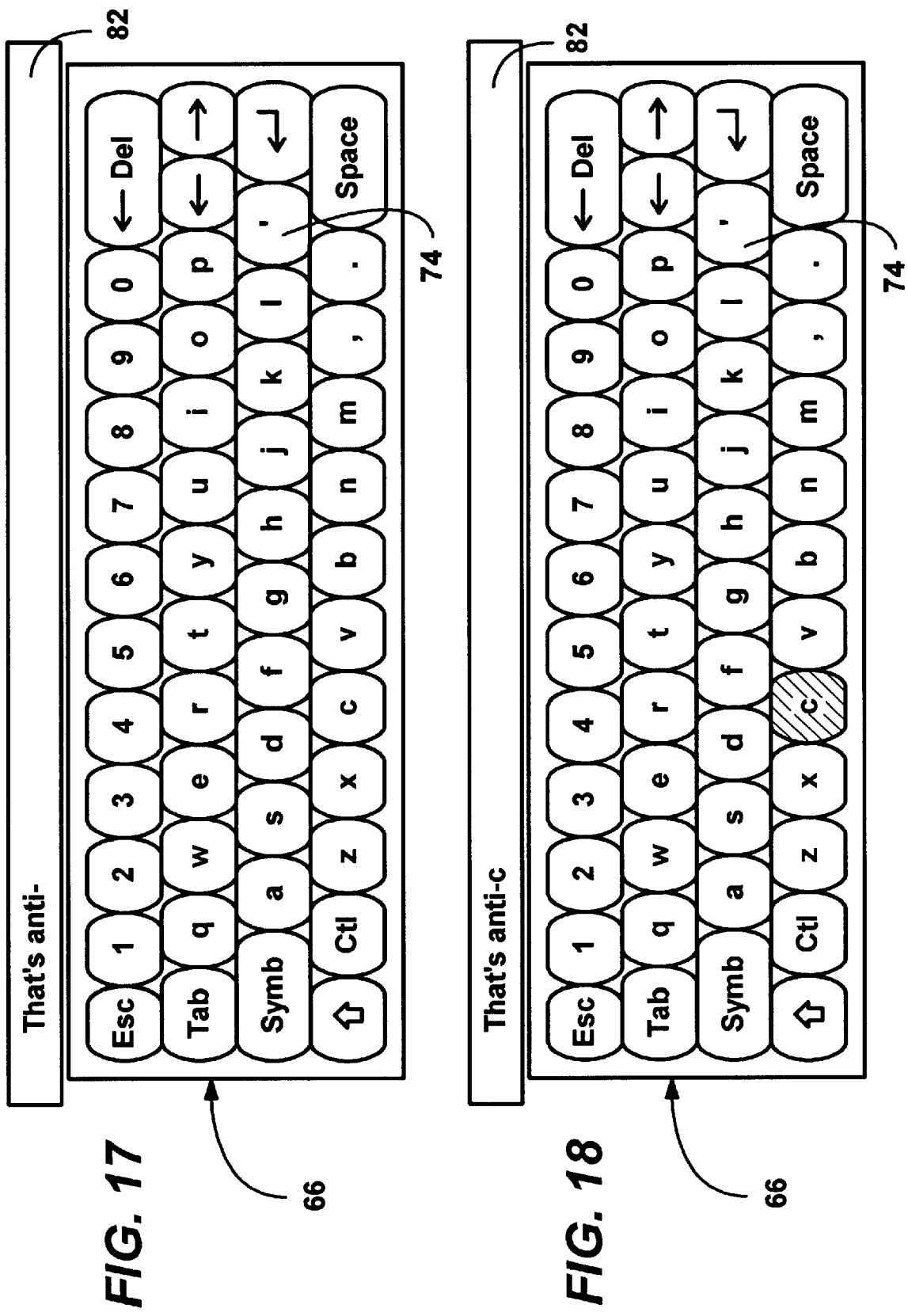

DYNAMIC KEYBOARD

FIELD OF THE INVENTION

The invention relates generally to computer systems, and more particularly to the input of data into a computer system.

BACKGROUND OF THE INVENTION

Small, mobile computing devices such as personal desktop assistants, including hand-held and palm-size computers and the like, are becoming important and popular user tools. In general, they are becoming small enough to be extremely convenient while consuming less and less battery power, and at the same time becoming capable of running more powerful applications.

Although such devices continue to shrink in size, size limitations are being reached as a result of human limitations. For example, a full character keyboard that enables user data input cannot be so small that human fingers cannot depress the individual keys thereon. As a result, such devices (e.g., palm-size computers) may eliminate the full size physical keyboard and provide a representation of a keyboard on touch-sensitive display. To this end, the user enters characters by touching the screen with a stylus at locations corresponding to the displayed keys. Of course, touchscreen devices can also be used simultaneously with devices having physical keyboards, whereby characters can also be entered by manually pressing the keys of the physical keyboard.

While a touch-screen device serves to provide a suitable means of user data entry, data entry panels and the keys displayed thereon are typically very small, which slows down user data entry and leads to erroneous data input. One way in which the individual keys may be made larger is to distribute the keys among various selectable keyboards according to some logical distinction, e.g., one keyboard for entering alphabetic characters, one for entering numeric characters and another for entering punctuation symbols. This may help by increasing key size, but potentially requires the user to do a lot of switching between the keyboards, and to hunt among the multiple keyboards for a desired character. For example, proper sentences include punctuation, however to include a complete set of alphabetic and punctuation symbols on a single displayed keyboard would render the keys on typical palm-size computers too small for most users.

SUMMARY OF THE INVENTION

Briefly, the present invention provides a method and mechanism for dynamically adjusting the meaning and the appearance of one or more dynamic keys on a displayed keyboard in response to a user's predicted need therefor. For example, a single dynamic key may change to a different punctuation symbol in response to predicted grammatical need, at times being a hyphen and at other times being an apostrophe. To this end, a display provides a representation of a keyboard having at least one dynamic key thereon, and a sensor detects user-activity on the keyboard, e.g., taps on a touch-sensitive display. A conversion mechanism converts the detected user-activity to an appropriate character, supplies the character to a prediction engine, and in response, receives a predicted next character. Depending on the predicted next character, the dynamic key may have its meaning and displayed representation changed.

Other advantages will become apparent from the following detailed description when taken in conjunction with the drawings, in which:

BRIEF DESCRIPTION OF THE DRAWINGS

FIGS. 9–18 represent a keyboard having a dynamic key change thereon over time in accordance with an aspect of the present invention.

DETAILED DESCRIPTION OF THE PREFERRED EMBODIMENT

Exemplary Operating Environment

Figure 1:
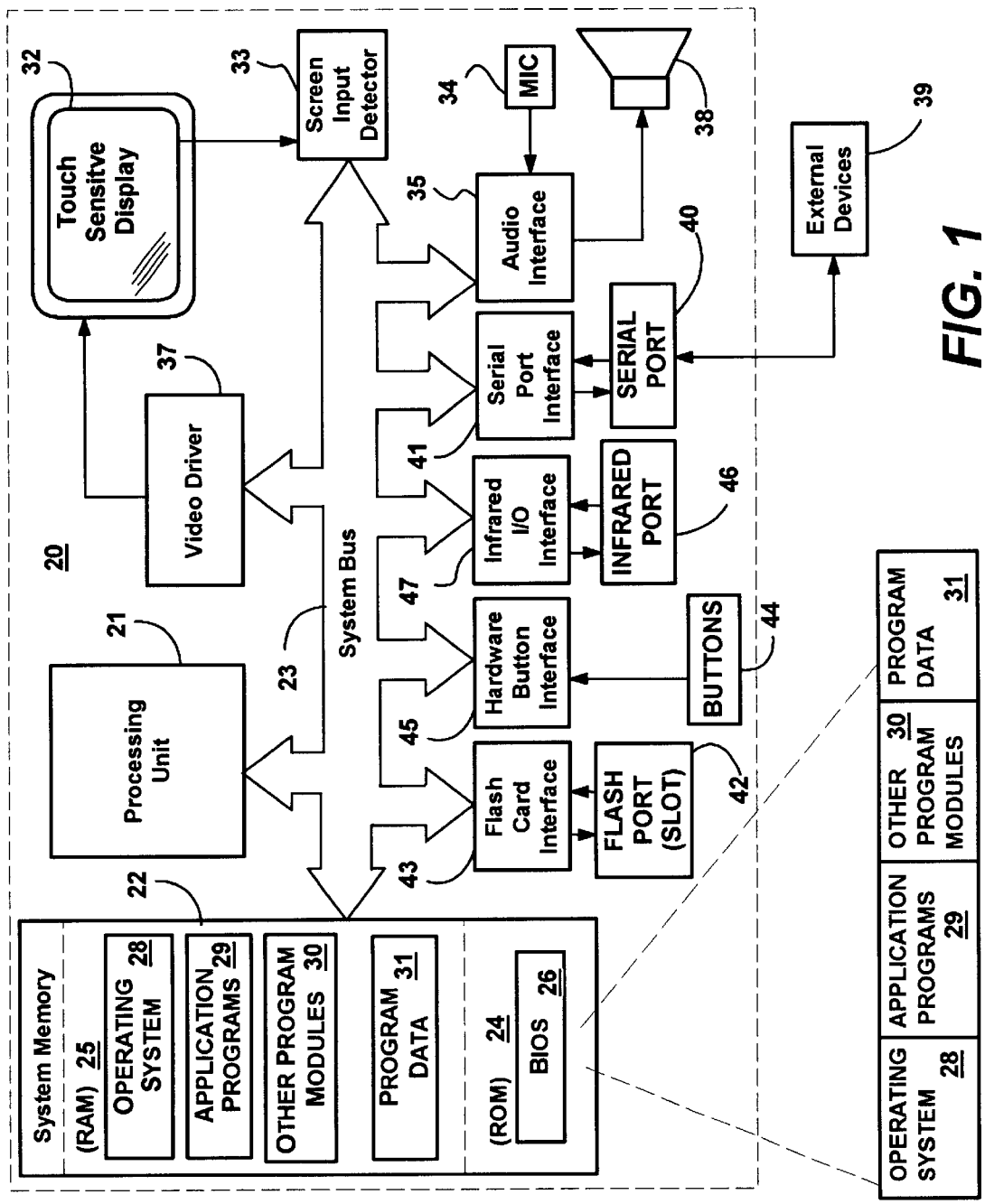
FIG. 1 is a block diagram representing a computer system into which the present invention may be incorporated.

FIG. 1 and the following discussion are intended to provide a brief, general description of a suitable computing environment in which the invention may be implemented. Although not required, the invention will be described in the general context of computer-executable instructions, such as program modules, being executed by a hand-held computing device such as a personal desktop assistant. Generally, program modules include routines, programs, objects, components, data structures and the like that perform particular tasks or implement particular abstract data types.

Moreover, those skilled in the art will appreciate that the invention may be practiced with other computer system configurations, including palm-top, desktop or laptop personal computers, mobile devices such as pagers and telephones, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a hand-held personal computing device 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the hand-held computer 20, such as during start-up, is stored in the ROM 24.

Figure 2:
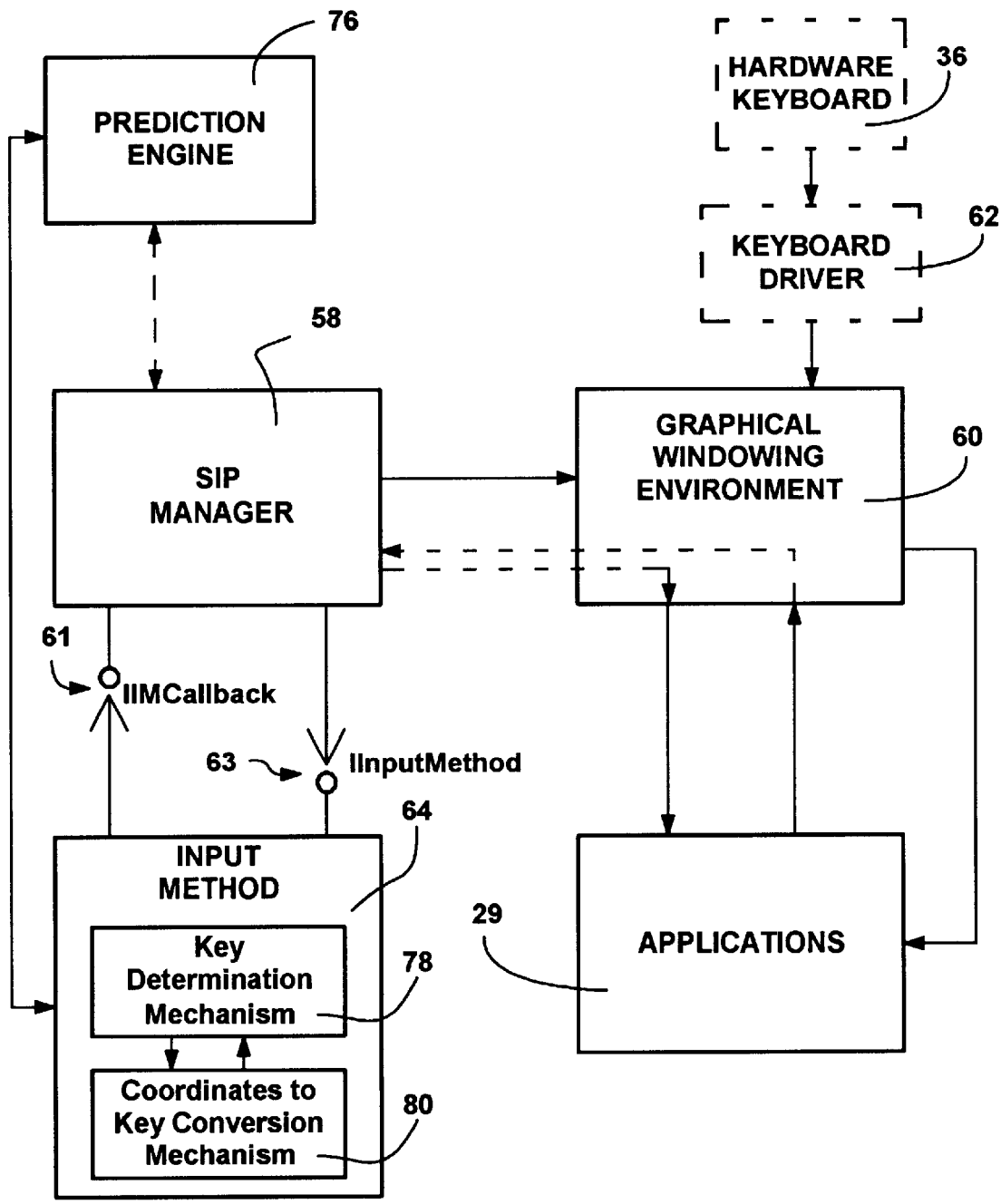
FIG. 2 is a block diagram representing various components and connections therebetween into which the present invention may be incorporated.

A number of program modules are stored in the ROM 24 and/or RAM 25, including an operating system 28 (preferably Windows CE), one or more application programs 29, other program modules 30 and program data 31. A user may enter commands and information into the hand-held computer 20 through input devices such as a touch-sensitive display screen 32 with suitable input detection circuitry 33. Other input devices may include a microphone 34 connected through a suitable audio interface 35 and a physical (hardware) keyboard 36 (FIG. 2). The output circuitry of the touch-sensitive display 32 is also connected to the system bus 23 via video driving circuitry 37. In addition to the display 32, the device may include other peripheral output devices, such as at least one speaker 38 and printers (not shown).

Other external input or output devices 39 such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held device 20 may further include or be capable of connecting to a flash card memory (not shown) through an appropriate connection port (e.g., slot) 42 and interface 43. A number of hardware buttons 44 such as switches, buttons (e.g., for switching application) and the like may be further provided to facilitate user operation of the device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used.

SOFT INPUT PANEL

The soft input panel architecture is primarily designed to enable character, key-based and other user data input via the touch screen 32 of the device 20 rather than a physical keyboard 36. However, as can be appreciated, a given computer system 20 may optionally and additionally include a physical keyboard, as represented by the dashed box 36 of FIG. 2. Moreover, as will become apparent, the "soft input panel" need not be an actual touch-sensitive panel arranged for directly receiving input, but may alternatively operate via another input device such as the microphone 34. For example, spoken words may be received at the microphone 34, recognized, and displayed as text in an on-screen window, i.e., a soft input panel.

FIG. 2 shows a block diagram implementing the SIP architecture. The computer system 20 includes an operating system (OS) 28 such as the graphical windowing environment 60. Such a graphical windowing environment 60 is generally operational to receive user input through a variety of devices including the keyboard 36, a mouse (not shown), a digitizer (not shown) and so on. In turn, the graphical windowing environment 60 may provide such user input to an application having "input focus," typically in the form of a keyboard character event. Note that a number of applications 29 may be executable by the computer system, however one application that is currently running is said to have "input focus" and receive the input.

The preferred architecture employs a SIP manager 58 to provide a single and flexible interface for a plurality of different input methods 64. In general, the SIP manager 58 provides keystrokes from a selected input method 64 to the graphical windowing environment 60 (e.g., the Windows CE operating system 28). Once received, the graphical windowing environment 60 sends information corresponding to the user input data to an application 29 (i.e., the application whose window currently has input focus) in the form of that keystroke, mouse or other message placed in the message queue of the application's window. The passing of such messages is well known in Windows programming and is described in "*Programming Windows* 95," Charles Petzold, Microsoft Press (1996), hereby incorporated by reference. As a result, any application capable of handling keyboard input may be used with any appropriately-configured input method 64. Indeed, if an optional keyboard 36 is present, keystrokes are directly provided by a keyboard driver 62 to the graphical windowing environment 60, whereby appropriate keystrokes are likewise placed in the message queue of the active application's window without the application being provided with information as to the source.

Input methods 64 may include, for example, various different displayable keyboards, (soft keyboards), a calculator, a formula and/or equation editor, chemical symbol template, voice recognition, handwriting recognition, shorthand symbol recognition (such as "Graffiti"), or other application-optimized input methods (e.g. a barcode reader). The SIP manager 58 provides a user interface for permitting a user to toggle a SIP window (panel) 50 (FIG. 7) between an opened and closed state, as described in more detail below. The SIP manager 58 also provides a user interface enabling user selection from a displayable list of available input methods. A user interacting with the user interface may select an input method 64, and in response, the SIP manager 58 loads and calls the selected input method 64. In a preferred embodiment, each of the input methods communicates with the SIP manager 58 through a COM (Component Object Model) interface shown as IIMCallback 61 and IInputmethod 63. A COM object comprises a data structure having encapsulated methods and data that are accessible through specifically defined interfaces. A detailed description of COM objects is provided in the reference entitled "*Inside OLE*," second edition, Kraig Brockschmidt (Microsoft Press), hereby incorporated by reference.

Generally, when the SIP window 50 is toggled between on/off by a user, as will be described in more detail below, the SIP manager 58 informs the selected input method 64 to correspondingly open/close the SIP window 50 through the IInputmethod mechanism 63. When a new input method is selected, the SIP manager 58, through the mechanism 63, informs any of the previously selected input methods to exit, and loads the newly selected input method. The interface 63 may also be utilized by the SIP manager 58 to obtain information specific to a selected input method, as also described in detail below.

The selected input method 64 may also communicate information to the SIP manager 58 via the IIMCallback mechanism 61, such as which character or characters were entered by a user, irrespective of whether the character or characters are generated through keyboard selection, handwriting recognition, voice recognition, a formula editor, calculator or the like. Such character input is generally passed to the SIP manager 58, preferably received as (or converted to) a Unicode character (for Windows CE) by the SIP manager 58 and output to the graphical windowing environment 60. Command key information, such as "Ctrl" on a keyboard, may also be provided by the input method 64 to the SIP manager 58 via interface 61.

SIP and input method-specific information may also be communicated through the SIP manager 58, and ultimately to the focused application 29, when the application is optimized for operating with a SIP (i.e., is "SIP-aware") as described in more detail below.

Figure 3:
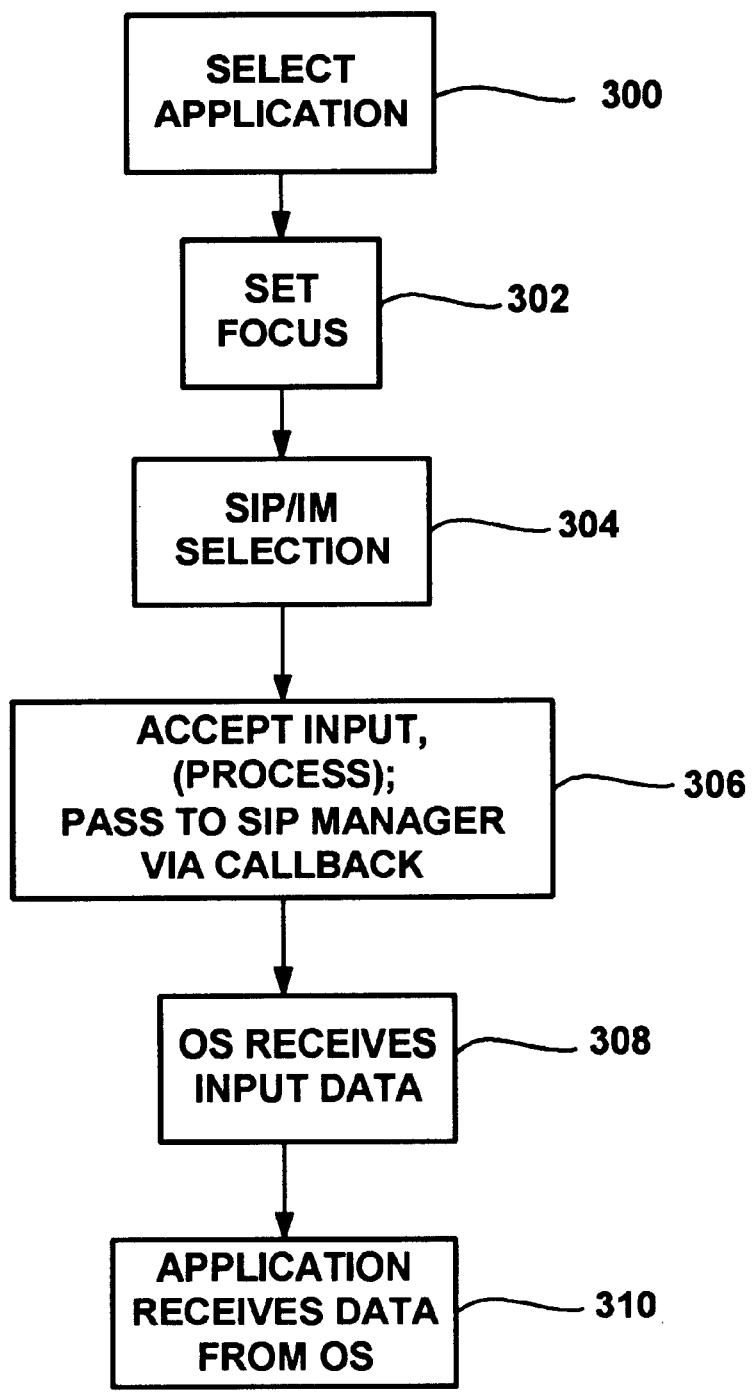
FIG. 3 is a flow diagram generally representing a process for getting user input from an input method to a selected application.

The system operates as generally represented in the steps of FIG. 3. Once an application is selected and has focus (steps 300–302), an input method 64 is selected therefor at step 304. Note that the input method 64 may be selected by the user, or a default input method may be selected for use with a particular application. Additionally, the input method 64 may be one that remains after having been selected for a previous application, i.e., a particular input method stays the same as the user switches between various applications. In any event, the input method 64 displays a SIP window 50 when selected.

As the user inputs data at step 306, appropriate data is passed to the SIP manager 58 via the IIMCallback mechanism 61, described below. Note that the input method 64 may first process the received data at step 306. By way of example, one particular input method 64 may convert barcode symbols to Unicode characters representing digits, another input method may convert mathematical entries into a Unicode result (e.g., an entry of '3+6=' sends a '9' to the SIP manager 58), while yet another may be an equation editor (e.g., the characters "Sqrt" are converted into a single Unicode value representing a square root symbol). After any such processing, the input method 64 passes those digits to the SIP manager 58, which in turn passes those digits to the graphical windowing environment 60. The application receives the character data from the graphical windowing environment 60 as if the user had entered those digits on a physical keyboard, regardless of the input method used.

Figure 4:
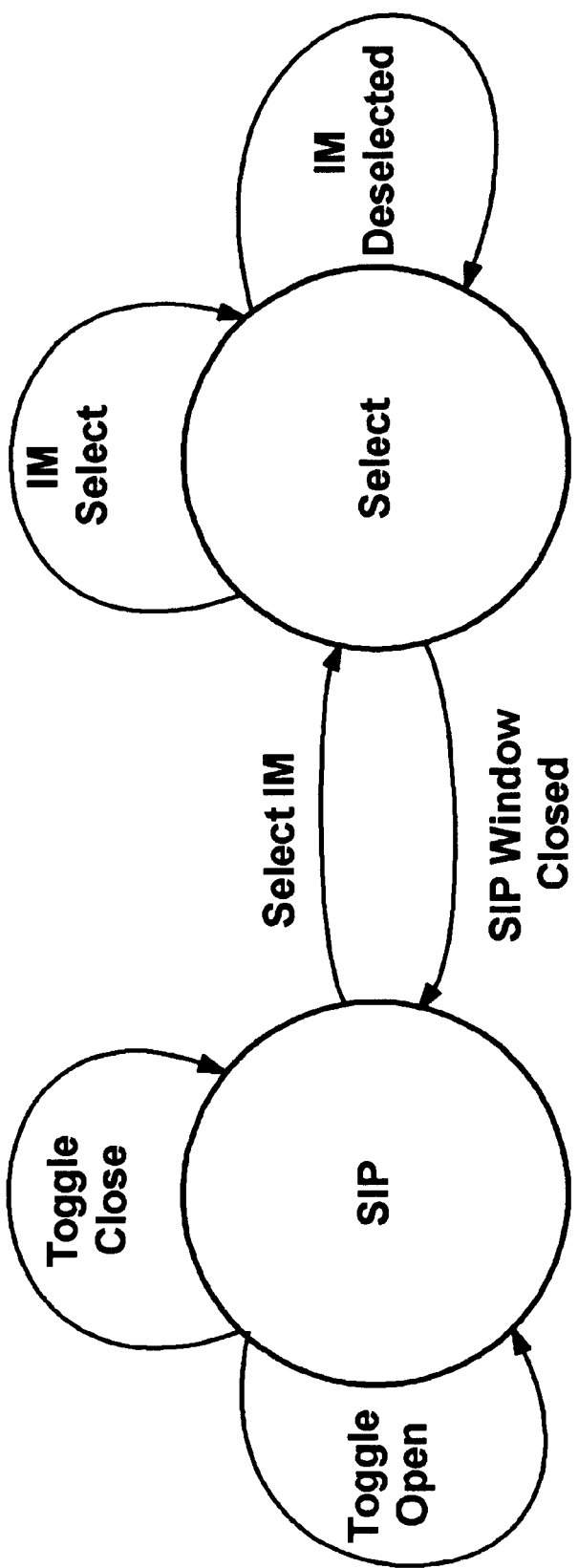
FIG. 4 is a state diagram generally representing SIP selection states.
Figure 5:
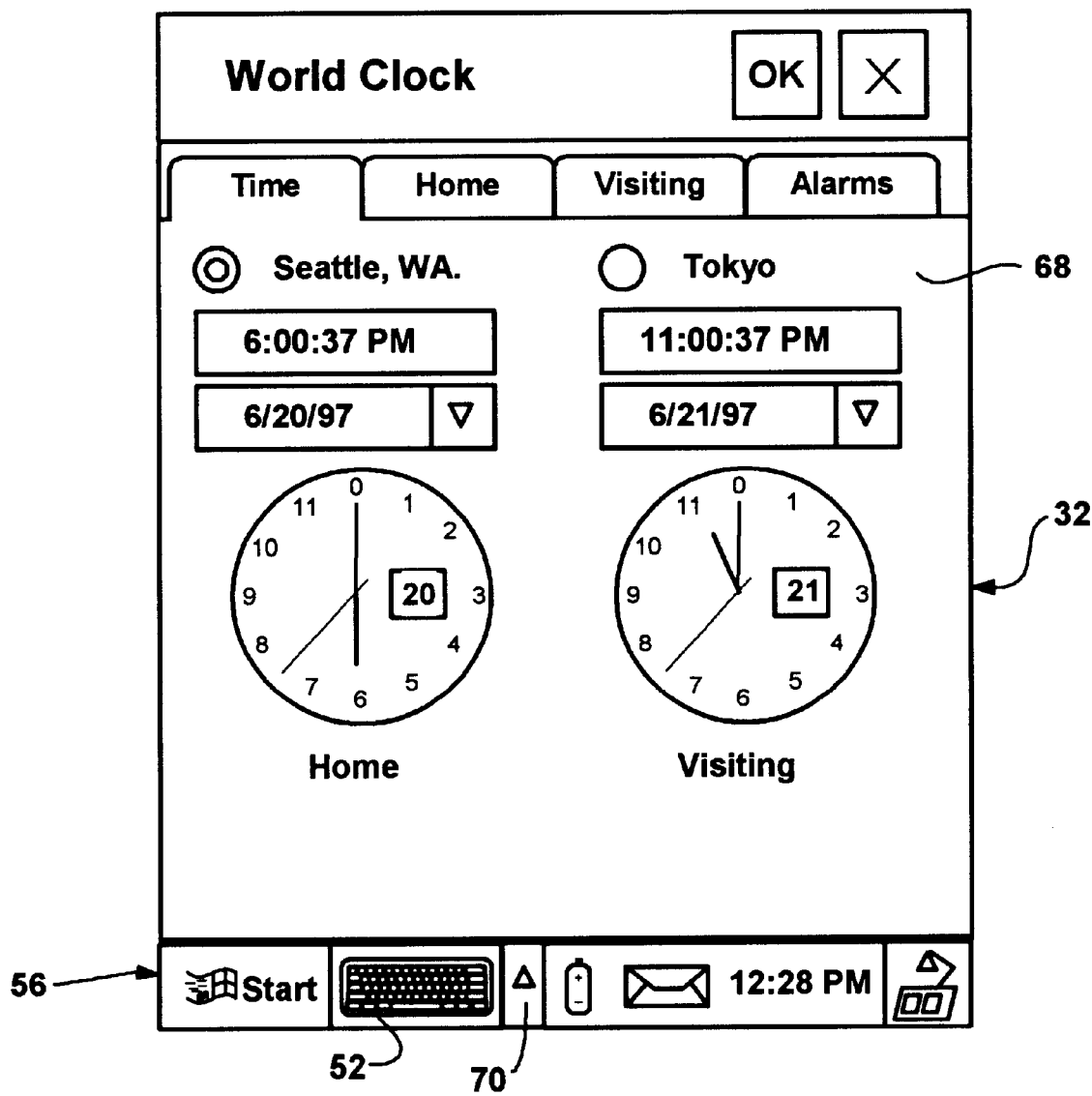
FIG. 5 represents a display on a touch-sensitive display screen on an exemplary computing device.
Figure 6:
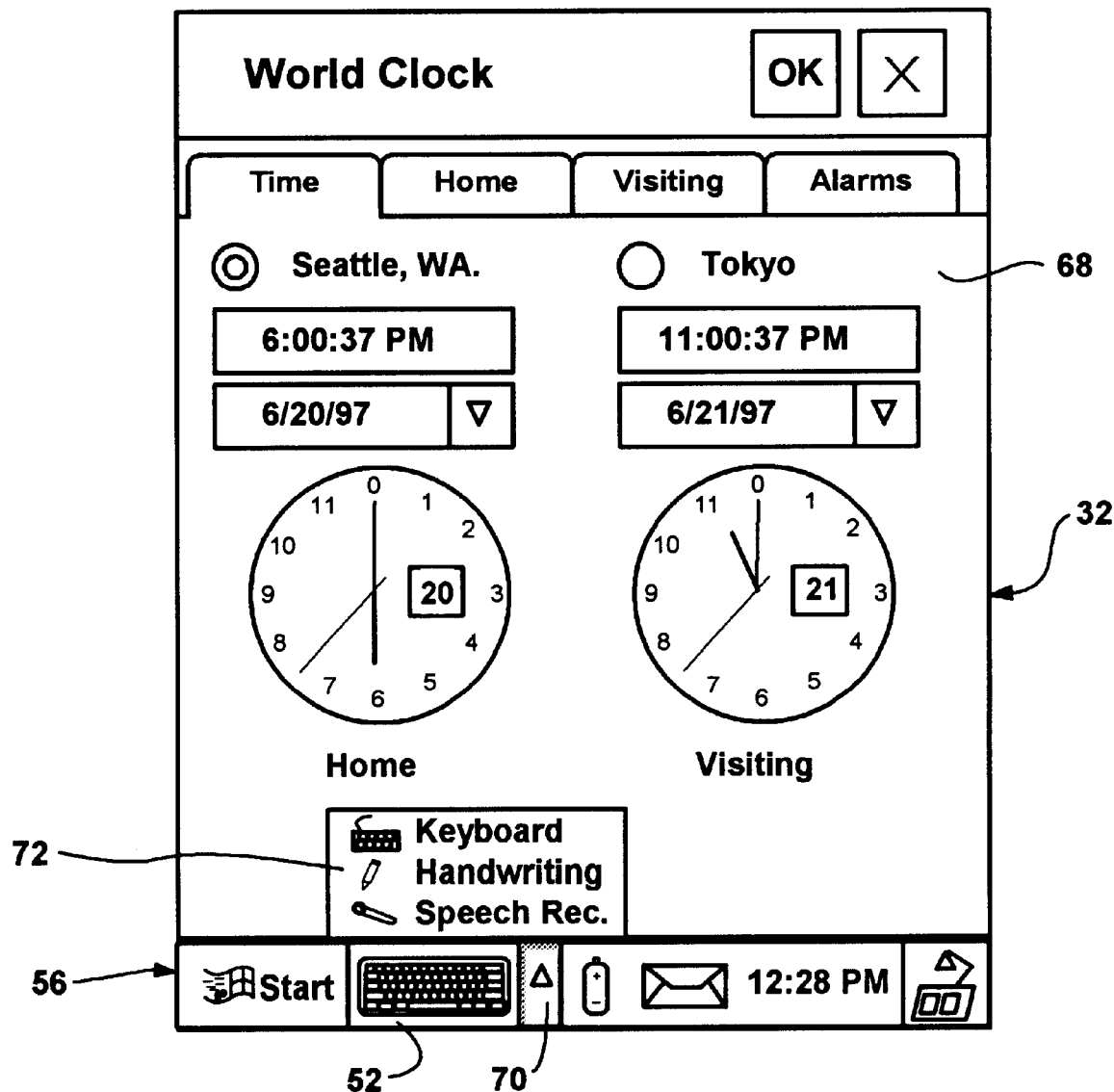
FIG. 6 represents a display on a touch-sensitive display screen on an exemplary computing device providing the ability to select from among interchangeable input panels.
Figure 7:
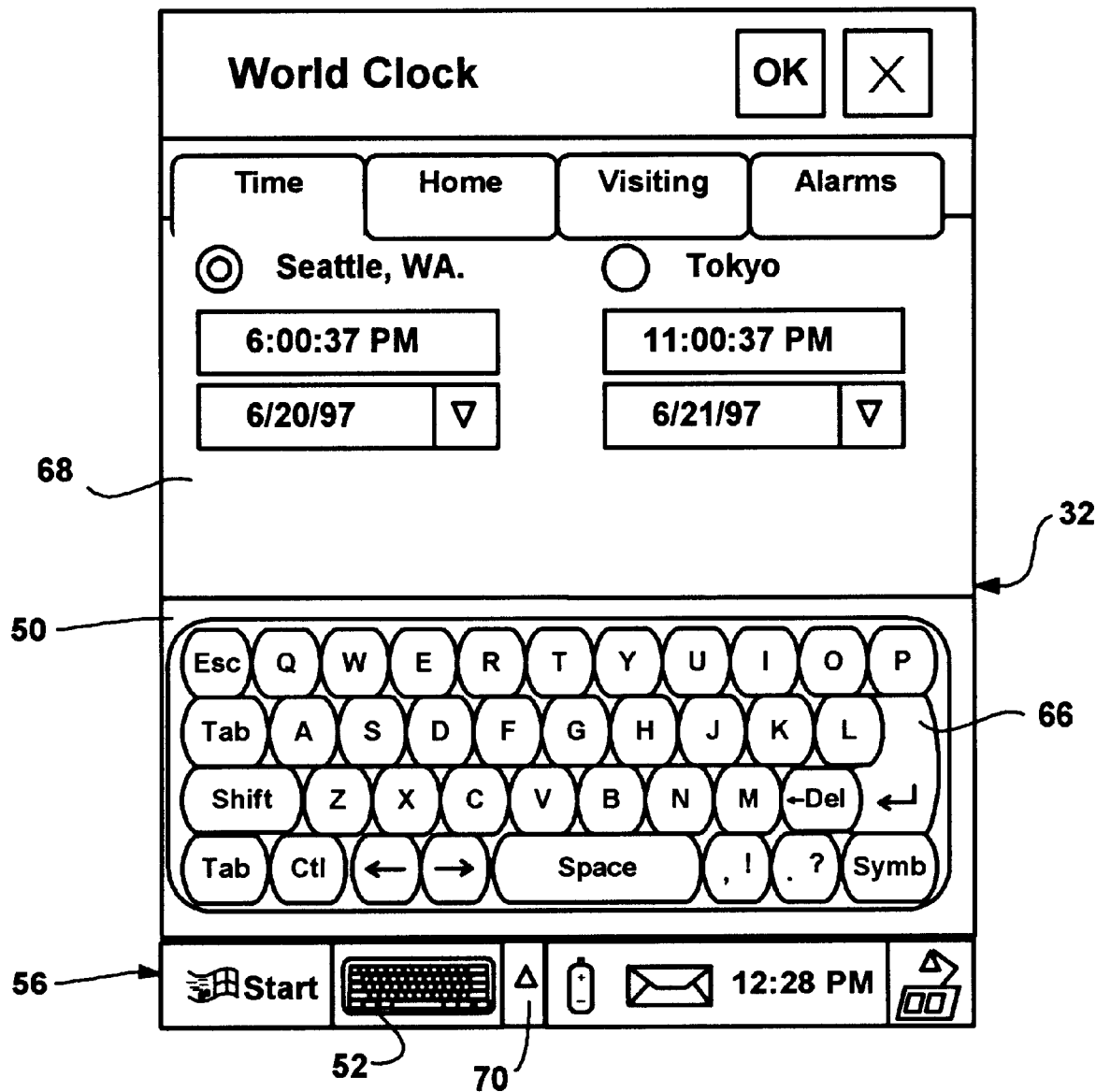
FIG. 7 represents a display on a touch-sensitive display screen wherein a keyboard has been selected as an input panel.

As shown in FIGS. 5–7, the soft input panel (SIP) functionality of the system collectively includes the visible window 50 (FIG. 7), a visible SIP button 52, and various methods and functions (described below). As shown in FIG. 7, the SIP window 50 is a rectangular area provided by the input method 64 that can be hidden or shown at the user's (or an application program's) request. The visible SIP button 52 is located on a taskbar 56 or the like, and provides a touch-sensitive interface by which the user displays or hides the SIP window 50. Thus, as represented in the state diagram of FIG. 4, the window 50 toggles between an open, visible state (FIG. 7) and a closed, hidden state (FIG. 5) as the user taps the SIP button 52. A present design implements a 240 pixel wide by 80 pixel high SIP window 50 that is fixed (docked) on the display 32 at a position just above the taskbar 56. As will become apparent below, the soft input panel design supports other SIP window 50 sizes or positions.

To this end, the operating system 28 creates a dedicated thread (the SIP manager 58) that registers itself as a SIP thread with the Windows CE system. The thread creates the SIP window 50, performs other SIP initialization, and then enters a message loop to respond to messages and user interface activity in the SIP window 50. The thread also serves to dispatch messages to an Input Method's window, and calls into the Input Method 64 to permit the Input Method 64 to create windows that will respond as special SIP windows.

The SIP manager thread 58 is given special status by the system. For example, windows created by the SIP manager 58 thread are topmost windows, and ordinarily will not be obscured by other windows, except, e.g., when the taskbar 56 is activated in an auto-hide mode while the SIP window 50 is displayed. In this case, the SIP window 50 remains displayed in its current location and the taskbar 56 is displayed on top of the SIP window 50. More generally, any user interface element for controlling the SIP may (and should) be placed on top of (rather than underneath) the SIP window 50, whenever the controlling user interface element and the SIP window 50 overlap.

Moreover, when tapped on, the SIP window 50 (and any child windows thereof such as pushbuttons, text entry fields, scrollbars and the like) will not receive the input focus as would conventional program windows. In this manner, the user may interact with the SIP window 50 without changing the system focus. As can be appreciated, changing the system focus each time the user inputs data into the SIP window 50 would be undesirable. The SIP button 52 will also not cause a change of focus for the same reason, i.e., it is undesirable to cause the window with focus to lose focus by tapping on the SIP button 52 to bring out the SIP window 50.

The SIP system enables the selective installation of a specified Input Method 64. As generally described above, each Input Method 64 is an interchangeable component by which the user provides character, text or other user data via the touch-screen display (or some other input device). More particularly, the SIP manager 58 preferably exposes a COM interface that enables the selective installation of Input Methods 64. The Input Method 64 occupies space inside a SIP window 50 created by the system.

Preferably, the Input Method 64 comprises a Component Object Model (COM) object that implements the IInputMethod interface. Notwithstanding, the Input Method 64 and SIP manager 58 can comprise virtually any components capable of communicating with one other through some mechanism, such as by receiving, responding to, and making function calls.

The Input Method 64 is responsible for drawing in the SIP window 50 and responding to user input in the SIP window 50. Typically, the Input Method 64 will respond to user input and convert that input into characters which are then sent to the SIP manager 58 via exposed SIP functions. By way of example, one Input Method 64 includes a default QWERTY (alpha) keyboard 66 shown in FIG. 7. More particularly, this Input Method 64 displays an image of the keyboard 66 on the screen 32, and converts taps on that keyboard 66 (detected as screen coordinates) into characters which are sent to the SIP manager 58 and thereby to the system. Input Methods may be written by application vendors, and are added to the system using COM component installation procedures.

The user interacts with the Input Method 64 manifested in the visible SIP window 50 to create system input. As best represented by the state diagram of FIG. 4 and as shown in FIG. 6, the user can select a different Input Method by tapping a SIP menu button 70 on the taskbar 56 that provides a pop-up input method list 72 into the SIP window 50. The user can also select among available Input Methods via a control panel applet (not shown) or the like. The SIP control panel applets communicate with the operating system 28 using the registry and the exposed SIP-aware functionality described below.

As will be described in detail below, the various components cooperate to expose functions, structures, and window messages that enable system applications 29 to respond to changes in the SIP state. An application 29 that uses this functionality to adjust itself appropriately to SIP changes is considered "SIP-aware." Other applications may be SIP-aware yet choose to retain their original size (and thus be partially obscured by the SIP window 50) when appropriate.

Moreover, and as also described below, there are exposed functions that enable applications to programmatically alter the SIP state.

Notwithstanding, applications 29 need not be aware of the SIP system in order to benefit from the present invention. Indeed, applications do not ordinarily recognize whether data received thereby originated at a hardware input device such as the keyboard 36 or via user activity (e.g., contact or proximity detected by the screen 32 and detection circuitry 33) within the soft input panel window 50. This enables applications to operate with virtually any appropriate input method, irrespective of whether that application is SIP-aware.

Turning to an explanation of the mechanism that facilitates the operation of an Input Method 64 installed by the SIP manager 58, a SIP-aware application 29 is notified when the SIP window 50 changes state and what the new, current state of the SIP window 50 is. The state includes whether the status of the SIP window 50 is visible or hidden, whether the SIP window 50 is docked or in a floating condition, and the size and position of the SIP window 50. As shown in the table below, a data structure (SIPINFO) contains this SIP information:

```
Typedef struct {
    DWORD       cbSize
    DWORD       fdwFlags
    RECT        rcVisibleDesktop
    RECT        rcSipRect
    DWORD       dwImDataSize
    Void        *pvImData
} SIPINFO;
```

The cbSize field may be filled in by the application program 29 and indicates the size of the SIPINFO structure. This field allows for future enhancements while still maintaining backward compatibility, and indeed, the size of the SIPINFO structure may be used to indicate the version to the components of the system. The fdwFlags field represents the state information of the SIP window 50, and can be a combination of three flags. A SIPF_ON flag that is set indicates that the SIP window 50 is visible (i.e., not hidden), while a set SIPF_DOC flag indicates the SIP window 50 is docked (i.e. not floating). A set SIPF_LOCKED flag indicates that the SIP window 50 is locked, i.e., the user cannot change its visible or hidden status. Note that a given implementation may not allow floating or locked SIP windows, however the capability is present within the system.

The rcVisibleDesktop field contains a rectangle, in screen coordinates, representing the area of the screen desktop 68 not obscured by the SIP window 50. If the SIP window 50 is floating (not docked), this rectangle is equivalent to the user-working area. Full-screen applications wishing to respond to SIP window 50 size changes can generally set their window rectangle data structure ("rect") values to this RECT data structure's values. If the SIP window 50 is docked and does not occupy an entire edge (top, bottom, left or right), then this rectangle represents the largest rectangle not obscured by the SIP window 50. However, the system may provide available desktop space 68 not included in the RECT data structure.

Next, the rcSipRect field contains the rectangle, in screen coordinates, representing the size and location of the SIP Window 50. Applications 29 will generally not use this information, unless an application 29 wants to wrap around a floating SIP window 50 or a docked SIP window 50 that is not occupying an entire edge.

The dwImDataSize field contains the size of the data pointed to by the PvImData member, which is the next field, i.e., a pointer to the Input Method-specific data. The data are defined by the Input Method 64.

Figure 8:
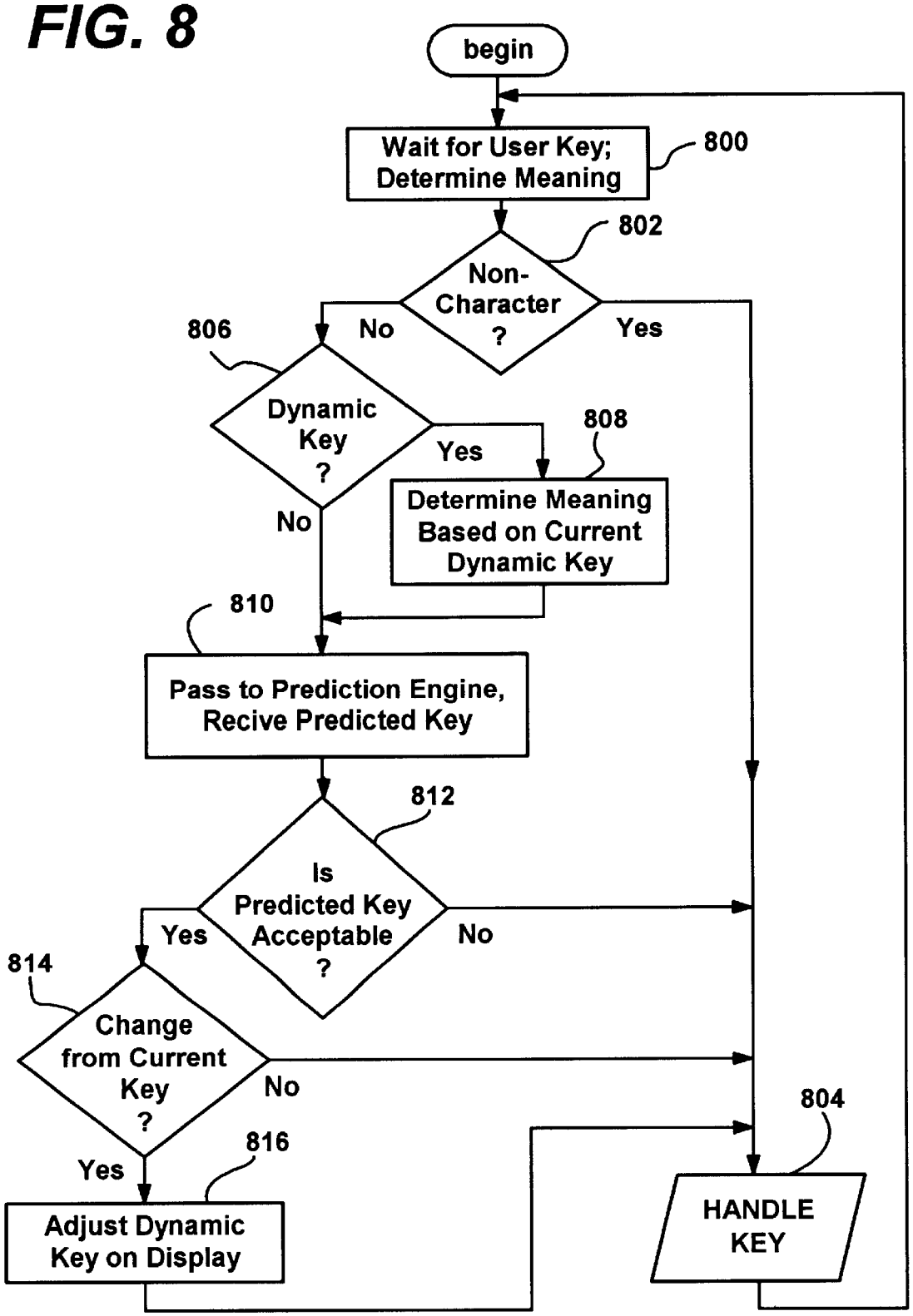
FIG. 8 is a flow diagram representing the general steps taken to determine a dynamic key in accordance with one aspect of the present invention.

Whenever the state of the SIP window 50 changes, i.e., a new Input Method has been selected and/or a visibility, docking or size change has occurred, a message, WM_SETTINGCHANGE, is sent to all top-level windows, as generally represented at step 800 of FIG. 8. In this manner, an application 29 can adjust itself to the new state of the SIP window 50, such as by adjusting its size in response to this message. To this end, a flag, SPI_SETSIPINFO, is sent with this message to indicate when SIP information has changed, and another flag, SPI_SETCURRENTIM, when the current Input Method has changed. As shown at step 802 of FIG. 8, the flag is tested to determine if the message is SIP-related or another type of setting change message (whereby it is handled at step 804). If SIP-related, for performance reasons, the applications that are not currently active in the foreground cache these SIP changes (steps 806–808). If the application's window is active, the application can adjust its size and/or window (steps 810–812). For example, as shown in FIGS. 5 and 6, when the SIP window 50 of FIG. 7 is hidden and an active application 29 notified, the application 29 may use the additional desktop space 68 to display more information such as the analog clock faces. Note that an application 29 that has cached a SIP change when inactive can query the current SIP state when activated to subsequently adjust itself in an appropriate manner in accordance with the information that is returned.

To query the SIP manager 58, another function, SHSipInfo, is provided so that applications 29 can determine information about the SIP window 50 and Input Method 64. In general, if this function succeeds, the return value will be nonzero, while if this function fails, the return value will equal zero and extended error information will be available via a GetLastError( ) call.

The following table sets forth the structure of this call:

```
SHSipInfo (
    UINT        uiAction
    UINT        uiParam
    PVOID       pvParam
    UINT        fwinIni
);
```

The uiAction parameter can include the values SIP_SETSIPINFO, SPI_GETSIPINFO, SPI_SETCURRENTIM and SPI_GETCURRENTIM. SIP_SETSIPINFO indicates that pvParam points to a SIPINFO structure (described above). The cbSize, dwImDataSize and pvImDataSize are filled in before calling the SHSipInfo function. In response to this call, the SIPINFO structure is filled in with the current SIP size, state, and visible desktop rectangle. If both dWImDataSize and pvImData are nonzero, the data size and pointer are sent to the Input Method 64. If the Input Method 64 is called but does not provide Input Method-specific data, or the format or size of the data passed in is not in a format recognized by the Input Method 64, then the SHSipInfo function call fails (returns zero). If the size and format are supported by the Input Method 64, the Input Method 64 fills in the buffer that is pointed to by pvImData with the Input Method-specific data. Typically, an application 29 will set the pvImDataSize to zero and pvImData to NULL.

A uiAction of SPI_SETSIPINFO indicates that pvParam points to a SIPINFO structure. The SIP window 50 size and state are set to the values specified in the SIPINFO structure. Before changing a SIP value, the application 29 should first obtain the current SIP state by calling SHSipInfo with SPI_GETSIPINFO, then change whatever specific SIP state values it wishes to change before making the SPI_SETSIPINFO call. The cbSize field is set to the size of the SIP in the structure, and if both pvImDataSize and pvImData are not zero, the data size and pointer are sent to the Input Method 64. The SHSipInfo call fails if the Input Method 64 is called and does not allow setting Input Method-specific data, or if the format or size of the passed data is not in a format recognized thereby. If a size and format are supported by the Input Method 64, the Input Method 64 uses the data to set Input Method-specific information. Typically, an application will set the pvImDataSize to zero and pvImData to NULL.

SPI_SETCURRENTIM indicates that pvParam points to a CLSID structure which specifies the CLSID of the Input Method 64 to which the SIP will switch. If the CLSID is not valid, or if the specified Input Method 64 cannot be loaded, the call fails (return value equals zero) and a default Input Method 64 (e.g., the QWERTY-like keyboard 66) is loaded.

Lastly, a uiAction of SPI_GETCURRENTIM indicates that pvParam points to a CLSID structure that receives the CLSID of the currently selected Input Method 64.

The IInputMethod Interface

IInputMethod is the interface implemented by the Input Method 64 components. The SIP manager 58 calls the methods of this interface to notify the Input Method 64 of state changes, and request action and information from the Input Method 64. In general, if the called method succeeds, a success is returned, and conversely, if the method fails, a failure result is returned. The following table sets forth the method calls available in this IInputMethod interface:

```
Interface IinputMethod : Iunknown
{
    HRESULT Select ( [in] HWND hwndSip );
    HRESULT Deselect ( void );
    HRESULT Showing ( void );
    HRESULT Hiding ( void );
    HRESULT GetInfo ( [out] IMINFO *pimi );
    HRESULT ReceiveSipInfo ( [in] SIPINFO *psi );
    HRESULT RegisterCallback ( [in] IIMCallback* pIMCallback );
    HRESULT GetImData ( [in] DWORD dwSize,
    [out] LPVOID pvImData );
    HRESULT SetImData ( [in] DWORD dwSize,
    [in] LPVOID pvImData );
    HRESULT UserOptionsDlg ( [in] HWND hwndParent );
}
```

An Input Method 64 will ordinarily receive a Select( ), GetInfo( ), ReceiveSipInfo( ) and Register Callback( ) method call, in sequence, before rendering the SIP window 50 space or responding to user actions. When the SIP window 50 is displayed (i.e., turned on), Showing( ) will be called by the SIP manager 58, after which the Input Method 64 issues a WM_PAINT message to render the SIP window 50.

The Selector( ) method is called when the Input Method 64 has been selected into the SIP. The Input Method 64 generally performs any desired initialization in response to this call. The Input Method is responsible for drawing the entire client area of the SIP window 50, and thus ordinarily creates its windows and imagelists (collections of displayable bitmaps such as customized icons) in response to this call. For example, the window handle of the SIP window 50 is provided to the Input Method 64 as a parameter accompanying this Select( ) method call, and the Input Method normally creates a child window of this SIP window 50. The Input Method 64 is also provided with a pointer to a value, which is set to nonzero by the Input Method 64 if the method call is successful or zero if not successful.

The Deselect( ) method is called when the Input Method 64 has been selected out of the SIP. The Input Method's window should be destroyed in response to this call, and the Input Method 64 will typically perform any other cleanup at this time.

The Showing( ) method will cause the SIP window 50 to be shown upon return from the call. Note that the SIP window 50 is not visible prior to this call, and that once the SIP window 50 is shown, this window and its children will receive paint messages. Conversely, the Hiding( ) method hides the SIP window 50 upon return from the call. Accordingly, the Showing( ) and Hiding( ) methods are used to toggle the SIP window 50 between its open and closed states.

The GetInfo( ) method is called when the system is requesting information about the Input Method 64. The information requested includes flags indicating any special properties of the Input Method 64, the handles of two imagelists which contain masked bitmaps that are to be displayed on the SIP button 52 when that Input Method 64 is active, indices into the specified imagelists, and a rectangle indicating the preferred size and placement of the Input Method 64. The call includes a parameter, pimi, which is a pointer to a data structure (IMINFO) that the Input Method 64 should fill in with appropriate data. The call also provides a pointer to a value that the Input Method should set to nonzero to indicate success and zero to indicate failure. More particularly, the IMINFO data structure is represented in the following table:

```
Typedef struct {
    DWORD cbSize;
    HIMAGELIST hImageNarrow;
    HIMAGELIST hImageWide;
    Int iNarrow;
    Int iWide;
    DWORD fdwFlags;
    Rect rcSipRect;
} IMINFO;
```

The cbSize field contains the size of the IMINFO structure, and is filled in by the SIP manager 58 prior to calling GetInfo( ). The hImageNarrow field is a handle to an imagelist containing narrow (16×16) masked bitmaps for the Input Method 64. Similarly, hImageWide is a handle to the imagelist containing wide (32×16) masked bitmaps. The SIP manager 58 displays one of the bitmaps (e.g., on the taskbar 56) to indicate the Input Method 64 that is currently selected. Note that the SIP manager 58 may use the 16×16 or 32×16 bitmaps at various times depending on how it wishes to display the bitmap.

The iNarrow field is an index into the hImageNarrow imagelist indicating which bitmap of several possible from that (narrow) imagelist should currently be displayed. Similarly, the iWide field is an index into the hImageWide imagelist indicating which bitmap from that (wide) image list should currently be displayed. Note that the Input Method 64 can initiate a change of the bitmap displayed in the SIP taskbar button 52 by calling IIMCallback::SetImages (described below).

The fdwFlags field indicates the visible, docked and locked states (SIPF_ON SIPF_DOCKED and SIPF_LOCKED) of the Input Method 64, as well as any special Input Method flags that may be defined in the future. Note that the SIP state flags are ignored for the GetInfo( ) method, but are used in the SetImInfo callback method as described below.

Lastly, the rcSipRect field describes the size and placement of the SIP rectangle. The sizing and placement information returned from GetInfo( ) may be used by the SIP when determining an initial default size and placement. When used, the SetImInfo callback method (described below) specifies the new size and placement of the SIP window 50.

The ReceiveSipInfo( ) method provides information to the Input Method 64 about the SIP window, including the current size, placement and docked status thereof. This call is made whenever the user, an application 29 or the Input Method 64 changes the SIP state. When the SIP manager 58 sends this information during Input Method initialization, the SIP manger 58 is informing the Input Method 64 of the default SIP settings. The Input Method 64 can choose to ignore these defaults, however the values given are ones that either the user has selected or values that have been recommended as expected or accepted SIP values for that platform. A pointer to the SIPINFO structure that includes this information is passed with this call.

The RegisterCallback method is provided by the SIP manager 58 to pass a callback interface pointer to the Input Method 64. In other words, the RegisterCallback method call passes an IIMCallback interface pointer as a parameter to the Input Method 64, whereby the Input Method 64 can call methods on this interface to send information back to the SIP manager 58 as described below. The Input Method 64 uses the callback interface pointer to send keystrokes to applications 29 via the SIP manager 58 and to change its SIP taskbar button icons 52.

The GetImData( ) method is called when an application program 29 has asked the SIP for the SIPINFOdata structure and has provided a non-NULL pointer for the pvImData member of the SIPINFO structure. The application 29 will ordinarily cause this call to be made when requesting some special information from the Input Method 64. Two parameters are passed with this call, dwsize, the size of the buffer pointed to by pvImData, and pvImData, a void pointer to a block of data in the application 29.

With this call, the application 29 is essentially requesting that the Input Method 64 fill the block with information, wherein the size and format of the data are defined by the Input Method 64. This call is designed for Input Methods 64 that wish to provide enhanced functionality or information to applications. By way of example, a SIP-aware application may wish to know whether a character was entered by way of the SIP or by some other means. An input method 64 can thus respond to the application's request by filling the block.

The SetImData( ) method is called when an application 29 has set the SIPINFO data structure and has provided a non-NULL pointer for the pvImData member of the SIPINFO structure. The application 29 will ordinarily cause this call to be made when requesting that the Input Method 64 set some data therein. The parameters passed with this call include dwsize, the size of the buffer pointed to by pvImData, and pvImData, a void pointer to a block of data in the application 64.

The IIMCallback Interface

The Input Method 64 uses the IIMCallback interface to call methods in the SIP manager 58, primarily to send keystrokes to the current application or to change the icon that the taskbar 56 is displaying in the SIP button 52. The Input Method 64 ordinarily calls the IIMCallback methods only in response to a call thereto which was received through an IInputMethod method call. In general, if the function succeeds, the return value will be a success HRESULT, while conversely, if the function fails, the return value is a failure HRESULT.

The following table represents the IIMCallback Interface:

```
Interface IIMCallback :
Iunknown
{
    Hresult SetImInfo (
        IMINFO *pimi );
    Hresult SendVirtualKey (
        BYTE bVk,
        DWORD dwFlags );
    Hresult SendCharEvents (
        UINT uVk,
        UINT uKeyFlags,
        UINT uChars,
        UINT *puShift,
        UINT *puChars );
    Hresult SendString (
        BSTR ptrzStr,
        DWORD dwChars );
}
```

The first callback, SetImInfo( ) is called by the Input Method 64 to change the bitmaps shown on the SIP taskbar button 52 representing the current SIP, or to change the visible/hidden state of the SIP window 50. It is also sent by the Input Method 64 to the SIP manager 58 as a notification when the Input Method 64 has changed the size, placement or docked status of the SIP window 50. By this mechanism, the various Input Methods 64 are able to alert the SIP manager 58 to these types of changes so that the two remain synchronized. By way of example, an Input Method 64 may wish to have a user interface element which allows the user to toggle between a docked state and a floating state, or between one or more subpanels (e.g. keyboard with buttons to switch to a number and/or symbol panel or international symbol panel). The Input Method 64 uses this call to inform the SIP manager 58 of each change in state.

Values passed in the IMINFO structure are used by the SIP manager 58. Consequently, the Input Method 64 should first determine the current state of the SIP window 50 as provided by the SIP manager 58 in the SIPINFO structure received via a prior ReceiveSipInfo( ) method call, described above. Then, the Input Method 64 should make changes to only those settings in which a change is desired, and pass a full set of values back in the IMINFO structure. The pimi parameter is sent as a pointer to an IMINFO structure representing the new Input Method 64 settings, including the size, placement and state of the SIP window 50 as well as the desired Input Method 64 images.

In response to the SetImInfo( ) call, the SIP manager 58 will show or hide the SIP window 50 as specified in the fdwFlags of the IMINFO structure. However, the SIP manager 58 will not resize or move the SIP window 50 if requested, but will instead update the size and placement information returned to applications 29 when queried. If the specified values represent a change from the current SIP state, the SIP manager 58 will notify applications 29 that the SIP state has changed via a WM_SETTINGCHANGE message, described above.

The SendVirtualKey( ) callback is used by an Input Method 64 to simulate a keystroke for a virtual key, e.g., a character or the like entered via the touch screen display 32 or some other Input Method 64. The key event will be sent to the window which currently has focus (i.e., the window which would have received keyboard input had a key been pressed on an external keyboard). The SendVirtualKey callback modifies the global key state for the virtual key sent, whereby, for example, an Input Method 64 can use this function to send SHIFT, CONTROL, and ALT key-up and key-down events, which will be retrieved correctly when the application 29 calls the GetKeyState( ) API. The SendVirtualKey callback should be used to send virtual key events that do not have associated characters (i.e., keys that do not cause a WM_CHAR sent as a result of TranslateMessage. Note that WM_CHAR, TranslateMessage and other key-related messages are described in the reference *"Programming Windows 95"*, Charles Petzold, supra). If character-producing virtual keys are sent via this function, they will be modified by the global key state. For example, a virtual key of VK_5 that is sent when the shift state is down will result in a '%' WM_CHAR message for certain keyboard layouts.

Parameters sent with this callback include bVk, which is the virtual keycode of the key to simulate, and dwFlags. The dwFlags may be a combination of a SIPKEY_KEYUP flag, (used to generate either a WM_KEYUP or WM_KEYDOWN), a SIPKEY_SILENT flag, (the key press will not make a keyboard click even if clicks are enabled on the device), or zero.

The SendCharEvent callback allows an Input Method 64 to send Unicode characters to the window having focus, while also determining what WM_KEYDOWN and WM_KEYUP messages the application 29 should receive. This allows the Input Method 64 to determine its own keyboard layout, as it can associate any virtual key with any characters and key state. Applications 29 thus see keys as if they were sent from a keyboard (i.e., they get WM_KEYDOWN, WM_CHAR, and WM_KEYUP messages). Thus, unlike the SendVirtualKey( ) function, this function does not affect the global key state. By way of example, with the SendCharEvent callback, the Input Method 64 can determine that the shifted (virtual key) VK_C actually sent the Unicode character 0x5564. The shift state flag (specified in the puShift parameter, described below) that is associated with the first character to be sent determines whether a WM_KEYDOWN or WM_KEYUP is generated.

Parameters include uVk, the virtual keycode sent in the WM_KEYUP or WM_KEYDOWN message generated as a result of this function, and a uKeyFlags parameter, a set of KEY state flags that are translated into the lKEYData parameter received in the WM_CHAR, WM_KEYUP or WM_KEYDOWN messages received by the application 29 as a result of this call. Only the KeyStateDownFlag, KeyStatePrevDownFlag, and KeyStateAnyAltFlag key state flags are translated into the resulting lKeyData parameter. The uChars parameter represents the number of characters corresponding to this key event, while the pushift parameter is a pointer to a buffer containing the corresponding KEY_STATE_FLAGS for each character to be sent. If the KeyStateDownFlag bit is sent, this function generates a WM_KEYDOWN message, otherwise it generates a WM_KEYUP message. Lastly, the puchars parameter is a pointer to a buffer containing the characters to be sent.

An Input Method 64 may use the SendString callback to send an entire string to the window which currently has the focus, whereby a series of WM_CHAR messages are posted to the application 29. An Input Method 64 would typically use this callback after it has determined an entire word or sentence has been entered. For example, a handwriting recognizer or speech recognizer Input Method 64 will use the SendString callback after it has determined that a full word or sentence has been entered.

Parameters of the SendString callback include ptszStr, a pointer to a string buffer containing the string to send, and dwSize, the number of characters to send. This number does not include the null-terminator, which will not be sent.

The Dynamic Keyboard

In accordance with one aspect of the present invention, an input method 64 provides a keyboard 66 and adjusts the meaning and/or the displayed representation of at least one dynamic key 74 (FIG. 9) on the keyboard 66 based on a predicted need therefor. To facilitate user data entry, the key preferably changes on the keyboard itself, where the user is concentrating, rather than in some prediction window isolated from the keyboard elsewhere on the display. Thus, for example, and as described in more detail below with reference to FIGS. 9–18, at one time the dynamic key 74 may display and mean a hyphen, while at another time the same key 74 at the same keyboard location may display and mean an apostrophe. As used herein, the terms "mean" and "meaning" with respect to a key is generally related to the encoded value that represents what is ultimately returned to an application program when the key is tapped.

To accomplish the changing of the dynamic key 74, as shown in FIG. 2, the input method 64 has access to (or includes) a prediction engine 76 or the like that returns one or more predicted characters in response to a series of one or more previous characters sent thereto. In keeping with the flexible architecture described above, the input method 64 may directly access the prediction engine 76, such as via a COM interface. Alternatively, the input method 64 communicate with the prediction engine 76 by invoking methods and receiving callbacks via the SIP manager 68 (as represented by the dashed line between the SIP manager 68 and the prediction engine 76). Prediction engines are known, such as from U.S. patent application Ser. Nos. 08/382,074 and 08/970,310, assigned to the assignee of the present invention and incorporated by reference herein in their entireties. For purposes of simplicity, the operation of such prediction engines will not be described in detail herein, however it is readily appreciated that prediction engines return one or more predicted characters (which may be punctuation symbols) in response to a series of one or more previous characters (e.g., trigrams) sent thereto.

To dynamically adjust the meaning and/or the displayed representation of the dynamic key (or keys) 74, the input method 64 includes a key determination mechanism 78. FIG. 8 shows the general conceptual logic of how the key determination mechanism 78 operates, beginning at step 800 wherein the input method 64 awaits a user entry.

When a key (e.g., user screen activity) is detected at step 800, its meaning is first determined. For example, at step 800 the input method 64 receives a user pen down event message including the coordinates of the user pen down event, and via a conversion mechanism 80 (FIG. 2) or the like, converts the coordinates to a key's meaning, such as by accessing a table corresponding to the current display. Next, step 802 determines whether the user action inputted a character or a non-character key, such as a shift key, control key, delete key or cursor key. If a non-character key was tapped, the process branches to step 804 wherein the key is handled. For example, a backspace or cursor key is passed to the application, while a shift key entry changes the meanings (state) of some of the keys on the keyboard. Note that if the key entered was a backspace or cursor key, the resulting change in cursor position may influence a next predicted key, and thus the input method 64 may also wish to obtain a prediction (described below) in response to cursor movement.

If instead step 802 determines that the key is a character key, step 802 branches to step 806 to test if the received key was a dynamic key of the present invention, i.e., a key that has different meanings at different times. If the key is a dynamic key, step 808 is executed which determines the key's current value based on its current meaning, such as either an apostrophe or a hyphen. Note that if a table stores values of the keys, as indexed based on the pen down coordinates, and that table is kept up-to-date with the current value of the dynamic key, steps 806 and 808 are unnecessary, as step 800 would have already returned the current value. In any event, step 810 is next executed.

In keeping with the present invention, at step 810, the input character value is passed to the prediction engine 76, which ordinarily returns a predicted next key based thereon. Note that the prediction engine 76 may return a message or the like indicating that it does not have enough information to predict a next key (such as a trigram-based prediction engine given only a first character). Moreover, the prediction engine 76 may return a plurality of predictions, such as with each prediction having an associated probability value. Lastly, it should be understood that the prediction engine 76 need not actually operate based on previous keys, but rather, may operate according to some other criteria, e.g., a prediction engine may base its predicted key based on a field in which the user is entering data. By way of example, consider an application having two fields for receiving a person's name and phone number, respectively. In accordance with the present invention, an input method may provide a dynamic key that is an apostrophe when the user is typing in the name field and a left parentheses (e.g., for entering an area code) when the user is in the phone number field. Note that with the present invention, the dynamic key may further change to a right parentheses after the left parentheses has been tapped while the user is in the phone number field.

Once a predicted key is available, step 812 then evaluates the returned key (if any) to determine if the predicted character is acceptable to the input method, such as based on the current state of the user input. By way of example, the prediction engine 76 may return an exclamation point as the next predicted character, however the input method need not accept this key if the input method only wants to offer a hyphen or apostrophe as the dynamic key. As can be readily appreciated, step 812 thus allows the input method 64 to operate with existing prediction engines, yet remain in control of the dynamic key being offered. Note that if instead of returning a single predicted key, the prediction engine 76 returns a ranked list of likely next keys, the determination mechanism scans the list for the most likely key that is also acceptable. If no acceptable predicted key is available, no change to the dynamic key needs to be made and thus step 812 branches to step 804 where the key that was input by the user is handled, (e.g., returned to the application 29).

However, if at step 812 the predicted key is acceptable to the input method 64, step 814 is executed to determine if it is the same key as that already being offered as the dynamic key 74. If so, no change is needed whereby step 814 branches to step 804 where as before, the key that was input by the user is handled (e.g., returned to the application). However, if the predicted key is a change from the current key, step 816 is executed to change the meaning of the key 74 currently being offered, which preferably includes changing the representation of the dynamic key 74 on the display.

At this time, the new meaning of the dynamic key is recorded by the input method 64 so that if later tapped, the proper key meaning will be returned to the application. For example, if a coordinates-to-key conversion table is used by the input method 64, the table may be changed at the dynamic key's location therein to store the new meaning of the dynamic key. Lastly, step 804 is then executed to handle the user's input character, i.e., pass it to the application as described above.

Note that as described above, the input method 64 determines the bitmap that is displayed when the input method 64 has been selected. Moreover, while selected, the input method 64 may change the entire bitmap that is displayed, such as when the "Symb" key is tapped from the alphabetic keyboard. Thus, one straightforward way in which to change the displayed dynamic key's appearance is to re-send a new bitmap to the SIP manager 85 as described above. Of course, since the image that is displayed is actually location-based information stored in video memory, for efficiency, to adjust the display, the input method 64 and SIP manager 58 may be arranged to communicate only the changes to the bitmap at the appropriate locations.

Figure 9:
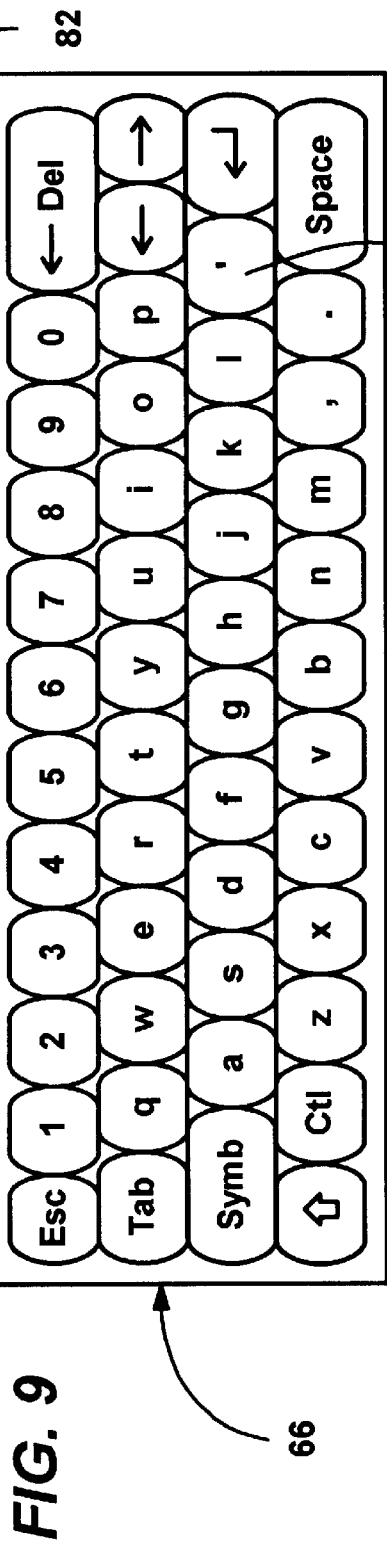
Figure 10:
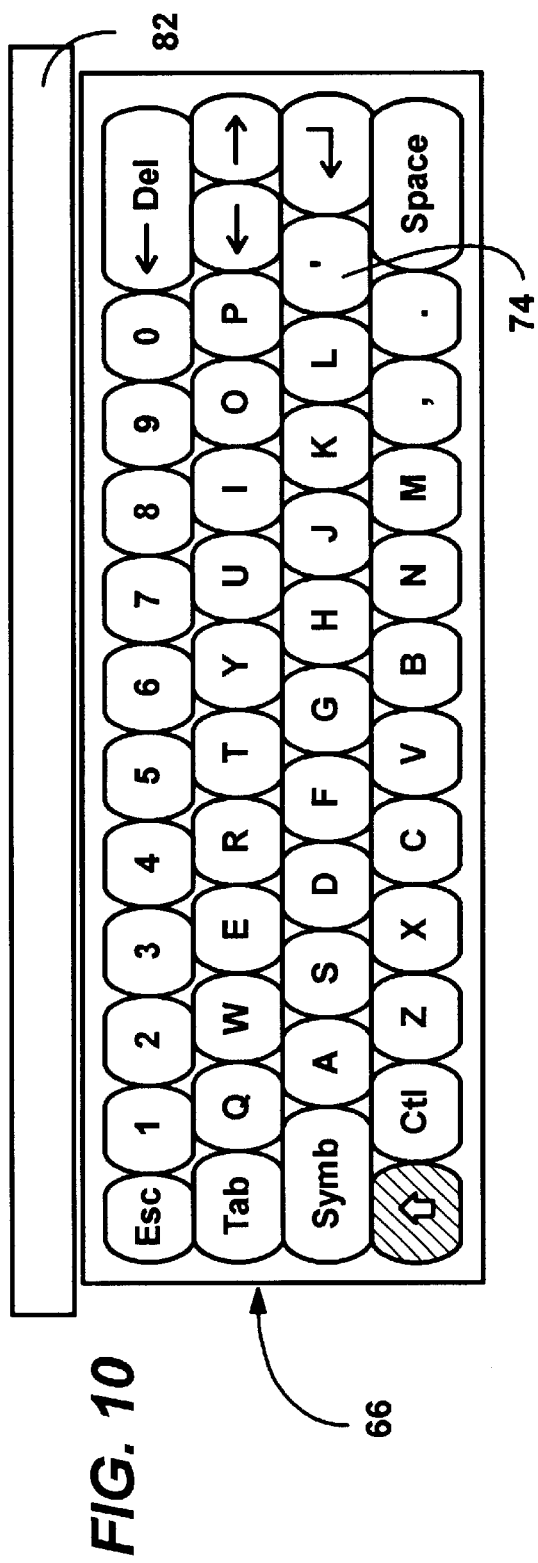

FIGS. 9–18 provide an example of the general operation of the present invention. As shown in FIG. 9, when the user selects an input method having a dynamic keyboard, the user is first presented with a keyboard 66, and, via the application, some visible typing buffer 82 or the like. As can be readily appreciated, although not shown for purposes of simplicity, the typing buffer 82 may for example, provide multiple lines such as in a word processor application, and/or be separated from the keyboard such as if displayed above the cells of a spreadsheet. In any event, in keeping with the invention, at least one dynamic key 74 is provided, shown herein as representing an apostrophe, by default. At this time, the dynamic key 74 thus displays an apostrophe (') character.

In accordance with the present invention, the dynamic key 74 changes in response to predicted need. By way of example, consider a user typing the expression "That's anti-climactic." To enter these characters, the user first hits the shift symbol (up-arrow) as represented by the shaded key in FIG. 10. Although not necessary to the present invention, this preferably changes the letter keys displayed on the keyboard to represent capital letters. The user continues in FIG. 11 by tapping the displayed capital letter "T" key, causing (via the application) a "T" to be entered and appear in the typing buffer 82. At this time, as described above with reference to FIG. 8, that character is passed to the prediction engine 76, whereby a predicted punctuation symbol may be returned. For purposes of the present example, at this time the prediction engine 76 returns either an apostrophe character or a code indicating that it needs more characters to return a prediction.

As shown in FIG. 12, once the single capital letter character ("T") was entered, the keyboard returned to its lowercase state. Note that the user may lock the keyboard into its uppercase state, such as by double-tapping the shift symbol, however in the present example the user has not done so. The user then continues entering the phrase by tapping on the "h" character as represented in FIG. 12 by the shaded "h" key and the entry shown in the typing buffer 82. The user then continues by entering the "a" and "t" of the word "That" (not separately shown). Note that after each character, the input method 64 via the SIP manager 58 sends the character to the prediction engine 76. However, for purposes of the present example, at this time the prediction engine 76 has not yet changed its predicted punctuation symbol.

Figure 13:
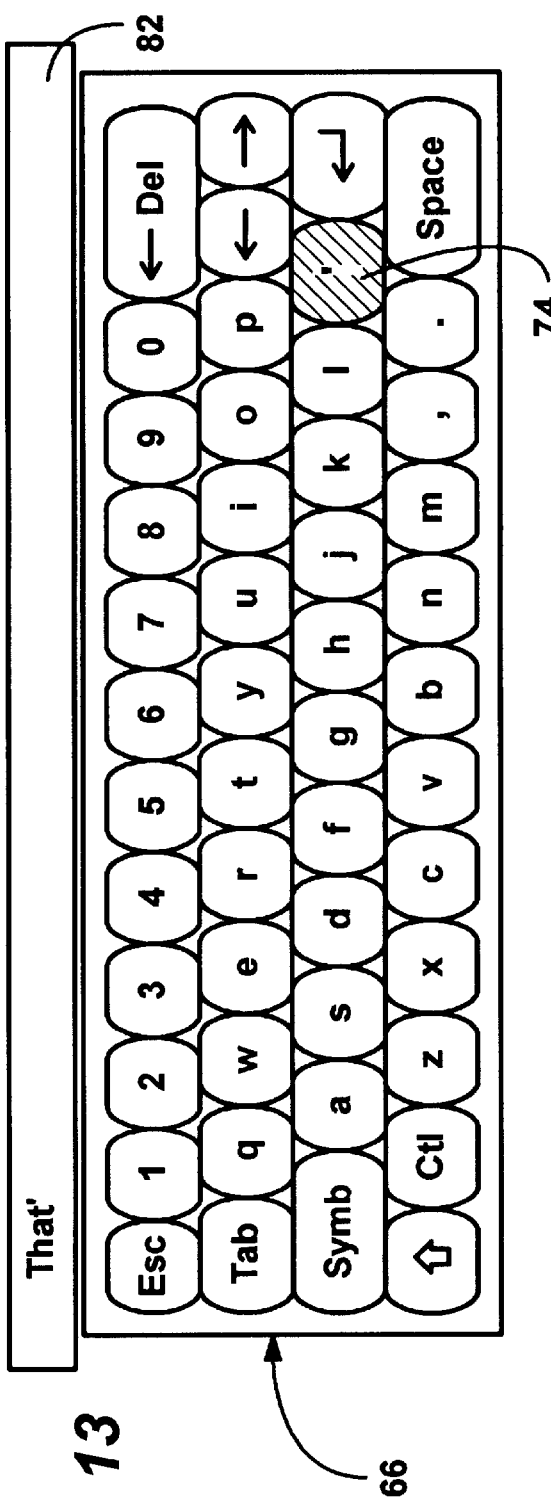
Figure 14:
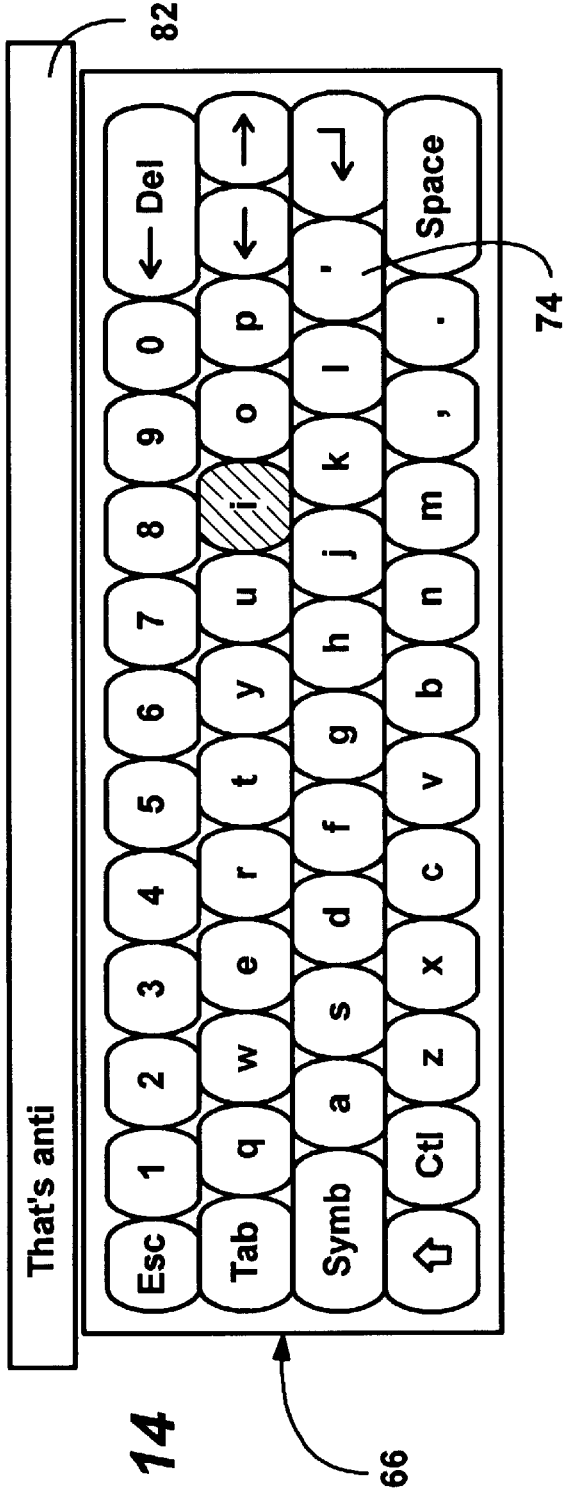
Figure 15:
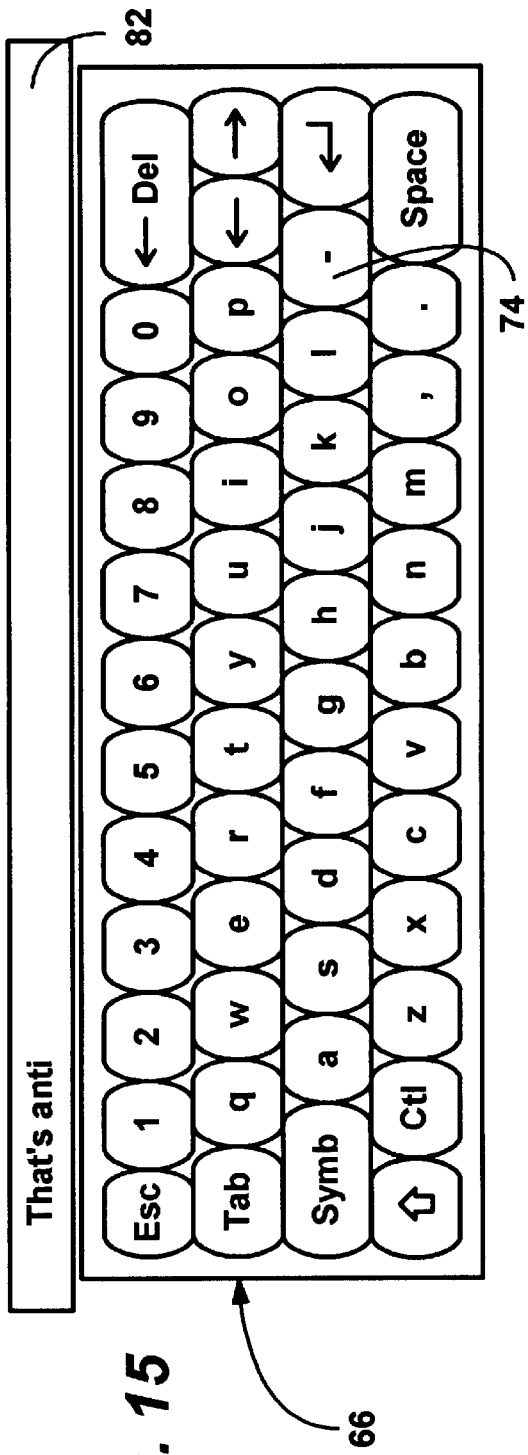

Next, as shown in FIG. 13, the user taps on the dynamic key 74, which at this time displays and means an apostrophe. As described above, this causes the apostrophe to be returned to the application and entered into the typing buffer 82. The user continues by entering a space character followed by the word "anti" as shown ending with the letter "i" in FIG. 14. This time, however, when the "i" is passed to the prediction engine 76, the prediction engine 76 effectively recognizes the word "anti" and returns a hyphen "-" as the predicted next character. FIG. 15 shows the display having been changed in response to this prediction, wherein the dynamic key 74 now displays and represents a hyphen following the entry of the "anti" prefix. Note that many words begin with "anti" that do not have a hyphen thereafter, however the prediction engine 74 computed that if any grammatical symbol is to follow these letters, it will most likely be a hyphen, and thus a hyphen is made available on the dynamic key 74. Note further that the user is still capable of entering an apostrophe or some other non-displayed punctuation symbol, however to do so the user will have to change the displayed keyboard to the punctuation symbol keyboard via the "Symb" key.

Figure 16:
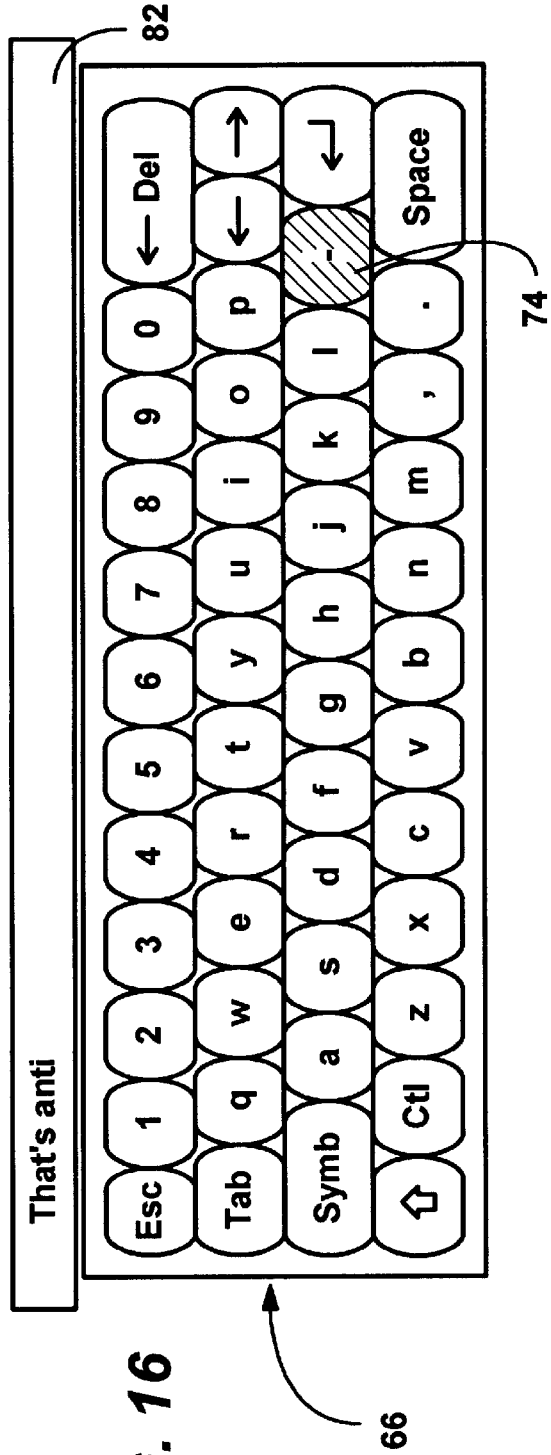

As represented in FIG. 16 by the shading of the dynamic key 74, the user next enters the hyphen by tapping on the dynamic key 74. When the hyphen entry is passed to the prediction engine 76, the prediction engine 76 returns an apostrophe as the most likely grammatical character to be next needed, whereby the keyboard adjusts its display and the meaning of the dynamic key 74 as shown in FIG. 17. At virtually the same time, the application receives a hyphen causing it to be entered into the typing buffer 82, as also shown in FIG. 17. Note that if the prediction engine 74 is relatively slow in providing the prediction, the entry may be passed to the application before or while the prediction is pending, so as to prevent the user from noticing any delay. The user continues by typing the letter "c" as represented by the shaded "c" key in FIG. 18, and so on until the task is completed, each time possibly changing the dynamic key 74 in accordance with prediction information returned from the prediction engine 76.

Lastly, as mentioned above, one dynamic key 74 may have more than two possible values at various times, (e.g., hyphen, left parentheses, right parentheses), and/or there may be more than one dynamic key on a given instance of a keyboard. Moreover, a single dynamic key may represent multiple keystrokes. For example, when using an input method arranged for writing and sending faxes, a dynamic key at one time may produce a user's entire return facsimile number via a single keystroke, and then later mean some other key or series of keys after the number has been tapped. The meaning and displayed representation of a dynamic key may be user-programmable or user-selectable, such as a user's personalized facsimile number as described above, or a "$" for entering U.S. currencies or a "£" for entering British currencies. For example, when a prediction engine returns a "$" as a likely needed character, the input method may convert it to the "£" symbol according to a user's previous preference setting.

As can be seen from the foregoing detailed description, there is provided an improved method system for entering user data into a computer system. The method and system are both efficient and flexible, and function with touch-sensitive and other types of input mechanisms. The method and system are cost-effective, reliable, extensible and simple to implement.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system having a graphical user interface, a method of providing keys to a user for data input, comprising the steps of, displaying a representation of a keyboard having a fixed set of character keys that do not change in response to characters that are input and a dynamic key thereon with a first meaning, receiving input information from the user, obtaining a predicted key from a prediction engine based on the input information received from the user, and automatically changing the dynamic key to have a second meaning in response to the predicted key.

2. The method of claim 1 further comprising the step of changing the displayed appearance of the dynamic key on the keyboard to correspond to the second meaning thereof.

3. The method of claim 1 wherein the step of receiving input information from the user comprises the step of receiving a plurality of characters corresponding to user taps on the displayed keyboard.

4. The method of claim 1 wherein the step of determining a predicted key based on the input information includes the steps of providing the input information to a prediction engine and receiving a prediction therefrom.

5. The method of claim 1 wherein the first and second meanings of the first and second dynamic keys correspond to distinct punctuation symbols.

6. The method of claim 1 wherein the keyboard includes at least one other dynamic key.

7. The method of claim 1 wherein one of the meanings of the dynamic key corresponds to a series of keys.

8. The method of claim 1 further comprising the steps of receiving additional input information from the user, determining a subsequent predicted key based on the additional input information received from the user, and changing the dynamic key to have the first meaning in response to the subsequent predicted key.

9. The method of claim 1 further comprising the steps of receiving additional input information from the user, determining a subsequent predicted key based on the additional input information received from the user, and changing the dynamic key to have a third meaning in response to the subsequent predicted key.

10. A computer-readable medium having computer-executable instructions for performing the method of claim 1.

11. A user data input mechanism, comprising, a display having a representation of a keyboard displayed thereon, a sensor for detecting user-activity corresponding to the keyboard, a conversion mechanism for converting detected user-activity on the keyboard to character input, a fixed set of character keys on the keyboard that do not change in response to characters that are input, a dynamic key on the keyboard having a current meaning and another meaning distinct therefrom, and a dynamic key determination mechanism for supplying character input to a prediction engine and receiving a predicted next character therefrom, the dynamic key determination mechanism deciding whether to change the meaning of the dynamic key from the current meaning to the other meaning in response to the predicted next character.

12. The input mechanism of claim 11 wherein the step of receiving input information from the user comprises the step of receiving a plurality of characters corresponding to user taps on the displayed keyboard.

13. The input mechanism of claim 11 wherein the current meaning of the dynamic key is a first punctuation symbol, and the other meaning of the dynamic key is a second punctuation symbol distinct from the first.

14. The input mechanism of claim 11 wherein the keyboard includes at least one other dynamic key.

15. The input mechanism of claim 11 wherein at least one of the meanings of the dynamic key corresponds to a series of keys.

16. The input mechanism of claim 11 wherein the display and sensor comprise a touch-sensitive input device.

17. The input mechanism of claim 11 wherein the dynamic key determination mechanism further determines a displayed appearance of the dynamic key.

18. The input mechanism of claim 17 wherein the dynamic key determination mechanism changes the displayed appearance of the dynamic key to correspond to the meaning of the dynamic key.

19. The input mechanism of claim 11 wherein the conversion mechanism comprises an input method.

20. The input mechanism of claim 19 wherein the input method comprises a component object model (COM) object.

21. In a computer system having a display and a sensor for detecting user-activity corresponding to the display, a user data input mechanism, comprising, a representation of a keyboard for displaying on the display, a conversion mechanism for converting detected user-activity corresponding to the keyboard to character input, a fixed set of character keys on the keyboard that do not change in response to characters that are input, a dynamic key on the keyboard having at least two distinct meanings, and a dynamic key determination mechanism for deciding whether to change the meaning of the dynamic key in response to a predicted need therefor.

* * * * *